US008639040B2

(12) United States Patent
Zhang et al.

(10) Patent No.: US 8,639,040 B2
(45) Date of Patent: Jan. 28, 2014

(54) METHOD AND APPARATUS FOR COMPARING VIDEOS

(75) Inventors: John R. Zhang, Calgary (CA); Yansong Ren, Plano, TX (US); Fangzhe Chang, Edison, NJ (US); Thomas L. Wood, Colts Neck, NJ (US)

(73) Assignee: Alcatel Lucent, Paris (FR)

( * ) Notice: Subject to any disclaimer, the term of this patent is extended or adjusted under 35 U.S.C. 154(b) by 231 days.

(21) Appl. No.: 13/206,856

(22) Filed: Aug. 10, 2011

(65) Prior Publication Data
US 2013/0039587 A1 Feb. 14, 2013

(51) Int. Cl.
*G06K 9/68* (2006.01)
*G06K 9/46* (2006.01)

(52) U.S. Cl.
USPC .......................................... 382/218; 382/201

(58) Field of Classification Search
USPC .................. 382/201, 203, 209, 218, 225, 284
See application file for complete search history.

(56) References Cited

U.S. PATENT DOCUMENTS

| 5,799,092 A | 8/1998 | Kristol et al. |
| 2008/0310734 A1 | 12/2008 | Ahammad et al. |
| 2012/0002884 A1 | 1/2012 | Ren et al. |

OTHER PUBLICATIONS

Cisco Video Surveillance 2500 Series IP Camera, Data Sheet No. C780455613-03, Cisco Systems, Inc., Feb. 2011, 6 Pages.
Rosten et al., Machine Learning for High-Speed Corner Detection, Proceedings of European Conference on Computer Vision, 2006, pp. 430-443.
Lucas et al., An Iterative Image Registration Technique With an Application to Stereo Vision, Proceedings of Darpa Imaging Understanding Workshop, Apr. 1981, pp. 121-130.
Fips Pub 180-3, Secure Hash Standard (SHS), Federal Information Processing Standards Publication, Information Technology Laboratory, National Institute of Standards and Technology, Oct. 2008, 32 Pages.
Rivest et al., A Method for Obtaining Digital Signatures and Public-Key Cryptosystems, Communications of the ACM, vol. 21, No. 2, Feb. 1978, pp. 120-126.
Koblitz, Elliptic Curve Cryptosystems, Mathematics of Computation, vol. 48, No. 177, Jan. 1987, pp. 203-209.
Miller, Use of Elliptic Curves in Cryptography, Advances in Cryptology—Crypto Proceedings: Lecture Notes in Computer Science,1986, pp. 417-426.

(Continued)

*Primary Examiner* — Daniel Mariam
(74) *Attorney, Agent, or Firm* — Fay Sharpe LLP (57) ABSTRACT

A method for comparing videos includes detecting local features in frames of a video and determining the positions of detected local features in a first frame compared to their respective positions in a succeeding second frame. For at least some of the detected local features, a movement indicator is generated representing the position of a local feature in the first frame relative to the position of that local feature in the second frame, the movement indicator including an orientation, to obtain a plurality of movement indicators. Movement indicators are grouped by orientation ranges. The number of grouped movement indicators in an orientation range are summed to obtain a value for that orientation range. A time series of values for at least one given orientation range is obtained by determining the positions of detected local features in a first frame compared to their respective positions in a succeeding second frame for a plurality of pairs of frames. For at least one orientation range, a first time series of values for a first video is compared with a second time series of values for a second video to determine the similarity of the first and second videos.

20 Claims, 4 Drawing Sheets

(56) References Cited

OTHER PUBLICATIONS

Batista et al., A Complexity-Invariant Distance Measure for Time Series, Proceedings of Society of Industrial and Applied Mathematics (SIAM) Conference on Data Mining, Apr. 28-30, 2011, Mesa, Arizona, pp. 699-710.

Keogh et al., An Online Algorithm for Segmenting Time Series, Proceedings of IEEEE International Conference on Data Mining, Nov. 29-Dec. 2, 2001, pp. 289-296.

Chaudhry et al., Histograms of Oriented Optical Flow and Binet-Cauchy Kernals on Nonlinear Dynamical Systems for the Recognition of Human Actions, IEEE Conference on Computer Vision and Pattern Recognition, 2009, pp. 1932-1939.

Lowe, Distinctive Image Features From Scale-Invariant Keypoints, International Journal of Computer Vision, vol. 60, Issue 2, Nov. 2004, pp. 91-110.

Bay et al., Surf: Speeded Up Robust Features, Computer Vision and Image Understanding, vol. 110, Issue 3, Jun. 2008, pp. 346-359.

Pong et al., Visual Event Detection Using Orientation Histograms With Feature Point Trajectory Information, IEEE International Conference on Multimedia and Expo, Jun. 28-Jul. 3, 2009, pp. 342-345.

Dalal et al., Histograms of Oriented Gradients for Human Detection, IEEE Computer Society Conference on Computer Vision and Pattern Recognition, vol. 1, Jun. 25, 2005, pp. 886-893.

Rublee et al., "ORB: An efficient alternative to SIFT or SURF", IEEE International Conference on Computer Vision (ICCV), Nov. 6, 2011, pp. 2564-2571.

PCT App. No. PCT/US2012/048925, International Search Report, mailed Dec. 11, 2012, 3 pp.

PCT App. No. PCT/US2012/048925, Written Opinion of the International Searching Authority, mailed Dec. 11, 2012, 5 pp.

Su et al., "Towards Effective Content Authentication for Digital Videos by Employing Feature Extraction and Quantization," IEEE Transactions on Circuits and Systems for Video Technology, vol. 19, No. 5, May 2009, pp. 668-677.

Mukherjee et al., "Recognizing Human Action at a Distance in Video by Key Poses," IEEE Transactions on Circuits and Systems for Video Technology, vol. 21, No. 9, Sep. 2011, pp. 1228-1241.

Weng et al., "From Image Hashing to Video Hashing," Advances in Multimedia Modeling, Springer Berlin Heidelberg, Jan. 6, 2010, pp. 662-668.

METHOD AND APPARATUS FOR COMPARING VIDEOS

FIELD OF THE INVENTION

The present invention relates to a method and apparatus for comparing videos.

BACKGROUND OF THE INVENTION

In a video hosting website, such as, for example, YouTube, Google Video and Yahoo! Video, video content may be uploaded by users to the site and made available to others via search engines. Statistics show that on YouTube, for example, which is one of the most popular video sharing sites, there are currently about two billion views a day, with 24 hours of video being uploaded every minute. The increasing popularity of social networking sites makes it even easier for users to obtain videos, edit them such as by adding logos or annotations for example, and upload modified videos to the same video sharing website or elsewhere. This results in potentially many similar or identical copies of a video shared on the same site, making it inconvenient for users to find the content which he or she actually wants and increasing the resources needed to store and serve the videos.

Videos may be considered by a user to be "essentially the same" or duplicates based on their overall content and subjective impressions. For example, duplicate video content may include video sequences with identical or approximately identical content but which are in different file formats, have different encoding parameters, and/or are of different lengths. Other differences may be photometric variations, such as color and/or lighting changes, and/or minor editing operations in the spatial and/or temporal domain, such as the addition or alteration of captions, logos and/or borders and/or resizing and cropping of frames. These examples are not intended to be an exhaustive list and other types of difference may also occur. Accordingly, a video copy can contain various distortions, modifications and format conversions from an original video and still be considered a duplicate of the original video.

The proliferation of duplicate videos can make it difficult or inconvenient for a user to find the content he or she actually wants. As an example, based on sample queries from YouTube, Google Video and Yahoo! Video, on average it was found that there are more than 27% near-duplicate videos listed in search results, with popular videos being those that are most duplicated in the results. Given a high percentage of duplicate videos in search results, users must spend significant time to sift through them to find the videos they need and must repeatedly watch similar copies of videos which have already been viewed. The duplicate results depreciate users' experience of video search, retrieval and browsing. In addition, such duplicated video content increases network overhead by storing and transferring duplicated video data across networks.

Content Based Copy Detection (CBCD) techniques facilitate video content based retrieval by searching a database of videos for copies (either exact or approximate) of a query video. Application of CBCD techniques may be beneficial in a number of ways for users, content producers or owners and network operators. For example, by detecting duplicate videos, video sharing sites may reduce the number of stored redundant video copies; users may have a better video search experience if they no longer need to browse through near-duplicate results; copyright holders may more easily discover re-useage of their video clips; and content distribution networks may direct users to access a nearby copy of video, the presence of which may not be otherwise known.

Video copy detection is the problem of determining if a given video contains a subsequence that is perceptually similar to a subsequence in a target video. More precisely, given a query video Q and a target video T both as a sequence of video frames, a video Q contains a subsequence of frames Qs that is a copy or near-copy of a subsequence of frames Ts in the target video T, if the dissimilarity between Qs and Ts is less than a noise threshold. There is no limitation on the lengths of both videos. Query video Q could be either longer or shorter than a target video T.

Various CBCD techniques have been proposed to find video copies based on identifying different video features and applying matching schemes to them. Since video sharing websites often contain a large database, it is challenging to find a similar or exact copy of a video from such a large video database and provide real-time response to Internet users.

Video copy detection may be divided into steps: generation of video feature descriptors and descriptor matching.

Video features may be represented by global descriptors and local descriptors. Global descriptors, including ordinal measures, are obtained from the entire region of a frame. Local descriptors, such as the Harris descriptor or a scale-invariant feature transform (SIFT), can be obtained by partitioning each frame into regions and extracting features from salient local regions. The Harris descriptor is also more specifically known as the "Harris corner detector" and detects corners in an image based on the eigenvalues of image gradients.

Local features may include, for example, color, texture, corners, and/or shape features from each region, or other features, this being a non-exhaustive list. In general, global feature descriptors are efficient to compute and compact in storage, but less robust with respect to local changes. Local feature decriptors are more robust but computationally more expensive and require more storage space.

BRIEF SUMMARY

According to a first aspect of the invention, a method for comparing videos includes detecting local features in frames of a video and determining the positions of detected local features in a first frame compared to their respective positions in a succeeding second frame. For at least some of the detected local features, a movement indicator is generated representing the position of a local feature in the first frame relative to the position of that local feature in the second frame, the movement indicator including an orientation, to obtain a plurality of movement indicators. Movement indicators are grouped by orientation ranges. The number of grouped movement indicators in an orientation range are summed to obtain a value for that orientation range. A time series of values for at least one given orientation range is obtained by determining the positions of detected local features in a first frame compared to their respective positions in a succeeding second frame for a plurality of pairs of frames. For at least one orientation range, a first time series of values for a first video is compared with a second time series of values for a second video to determine the similarity of the first and second videos.

An embodiment in accordance with the invention may thus provide robustness and distinctiveness because the method uses local features in detecting duplicate videos. Additionally, it can provide relatively quick processing as it is computationally efficient and also requires less storage space compared to that associated with previously known approaches based on local feature descriptors.

The entire first and second videos may be processed and checked for matching but in some embodiments, only sections of the videos are used to detect if similarity exists between them.

There are a number of different feature detectors available that could be used to detect local features in an embodiment. Examples of feature detectors include Harris is corner detector, ORB, SIFT, FAST, Sobel, MSER and PCBR and they may detect edges, corners, blobs or some other aspect or combination of aspects. In some feature detectors, a local feature is referred to as a keypoint and this terminology is also used in this specification where appropriate. FAST and ORB have proved to provide particularly good results in testsing.

The movement indicator may be generated, for example, by computing local feature descriptors, using for example, SIFT or BRIEF or some other suitable algorithm and applying descriptor matching to find corresponding local features across frames. The motion vector is derived from the positions of the corresponding featues. match produce a motion vector. Thus, for example, with BRIEF, Hamming distances may be used to match BRIEF descriptors. Once two matching features are found, the orientation is simply computed from the vector formed by the relative positions of the two features.

In one embodiment, the movement indicator includes a distance parameter and the movement indicator is included in a grouping by orientation range if its distance parameter is within a given size range and not included in a grouping by orientation range if its distance parameter is outside said given size range. For example, where pixels are used to characterize the distance parameter of a movement indicator, upper and lower thresholds may be set such that only, say, those movement indicators having a size of between 3 and 15 pixels are included in the groupings, the remainder being discarded from further processing. The size of between 3 and 15 pixels is mentioned as an example only as an effective range to use. However, it is not essential that this range be used and it is not intended to be limiting. By setting appropriate upper and lower thresholds tor the distance parameter, it reduces the likelihood of false matches or unrepresentative motions. That is, extremely long movement indicators imply that a keypoint has moved extremely fast across a frame, which is unlikely if the video is extracted at a normal frame rate. Extremely short motion vectors may simply be a stationary point that has been detected inconsistently, and therefore did not actually move. In an embodiment, the distance parameter range may be fixed and may be any suitable range for the videos under consideration. In another embodiment, the distance parameter range may be variable to allow adjustment, for example, in dependence on the results achieved so as to refine the process or adjusted for different types of video or characteristics of a video under consideration, or for some other reason or desired output.

In an embodiment, movement indicators are grouped by orientation ranges into one of four to ten orientation ranges. Thus, for example, there may be eight groupings or bins each having a range of 45 degrees, with the first grouping being for movement indicators with an orientation of from zero to 45 degrees, the second grouping being for movement indicators with an orientation exceeding 45 degrees and up to 90 degrees, and so on. Fewer than four orientation ranges may be used, but this provides less information for the duplicate detection process. More than ten orientation ranges results in a greater amount of available information but there would be a loss of robustness to video editing.

When time series of values have been produced for at least one orientation range, a first time series of values for a first video is compared with a second time series of values for a second video to determine the similarity of the first and second videos. In one embodiment, for example, where there are eight orientation ranges or bins, the time series for the first video from the first bin only, having an orientation range from zero to 45 degrees, is compared with the time series for the second video from the first bin only, also having an orientation range from zero to 45 degrees. This means that not all of the available information is used in the comparison.

In another embodiment, a plurality of time series for the first video are combined to produce a first time series signature. This may include all of the time series or in another embodiment, only a subset of them. The same process is carried out for the second video to produce a second time series signature. Then the time series are compared by the step of comparing the time series signatures which combine information from a plurality of time series for each video.

In one embodiment, to further reduce the time required to determine if the first and second videos are duplicates, time series linear segmentation techniques may be used to compress time series, or time series signatures where a combination of time series is used, into a discrete list of linear inclines/declines. Then a major incline matching technique may be implemented to find the potential alignment positions of the compared time series or time series signatures.

Thus, an embodiment includes segmenting the first time series and the second time series into a respective set of discrete linear segments; performing local sequence alignment of those linear segments; and selecting major inclines and major declines from the segmented time series and using the major inclines and major declines in performing alignment to determine the similarity of the first and second video. In another embodiment, this is carried out for time series signatures.

In an embodiment, alignment of the first time series with the second time series is performed. The best similarity distance between aligned first time series and second time series is calculated and the best similarity distance compared with a given threshold value to determine if the first video and the second video are duplicates. This may be implemented for time series signatures in another embodiment.

The first frame and second frame may be immediately adjacent one another or there may be intervening frames.

In an embodiment, the plurality of pairs of frames are separated by intervals of other frames that are not processed for use in comparing the videos. The intervals may he fixed, variable or random, for example. In an embodiment, switching may be carried out between different types of interval, say from fixed to random, during processing of a video or in another embodiment, remain in one mode during the process. In another embodiment, no intervals may he included.

According to a second aspect of the invention, a device is programmed or configured to perform a method in accordance with the first aspect.

According to a third aspect of the invention, a data storage medium is provided for storing a machine-executable program for performing a method in accordance with the first aspect.

BRIEF DESCRIPTION OF THE DRAWINGS

Some embodiments of the present invention will now be described by way of example only, and with reference to the accompanying drawings, in which:

FIGS. 4(*a*), 4(*b*), 4(*c*) and 4(*d*) schematically illustrates changes in an orientation bin for different videos across time.

DETAILED DESCRIPTION

Figure 1:
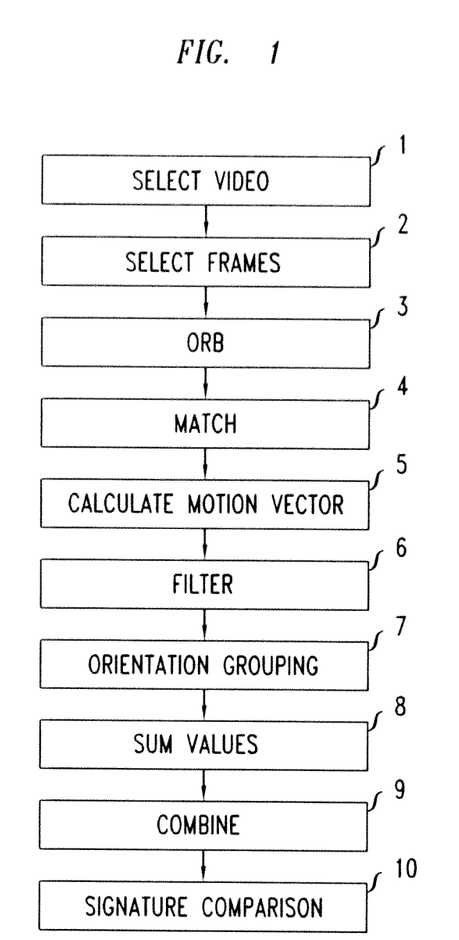
FIG. 1 schematically illustrates a method in accordance with the invention.

With reference to FIG. 1, a video that is to be involved in a duplicate video detection procedure comprises a plurality of frames and is selected at 1 for processing. A pair of successive frames is selected at 2. In this embodiment, frames are sampled with an interval of 10 frames per interval. Then each sampled frame is compared with its adjacent next frame to track local feature movement. At 2, a selection is made of frame number 0 and adjacent frame number 1.

The frames are applied to a local feature detector at 3, which in this embodiment is ORB. Frame number 0 is analysed using ORB to extract local features and the same process applied to frame number 1. This results in keypoints associated with frame number 0 and keypoints for frame number 1.

The keypoint information is applied to a descriptor matching processor at 4 to determine the correspondence between keypoints in the two frames. When matching is found, a movement indicator or motion vector is calculated at 5.

The motion vectors are applied to a filter at 6 to ensure that only those within a specified length are considered during the ensuing processing.

At 7, the orientations of the filtered retained motion vectors are determined and grouped into appropriate orientation ranges or bins. In this embodiment, there are eight bins each covering 45 degrees.

The aggregate of the number of keypoints for each bin is calculated at 8 by summing them to give a value for each bin.

Having carried out this process for frame numbers 0 and 1, the steps are repeated for the next pair of frames to be considered. The next frames are frame number 11 (for a sample_interval=10) and frame number 12. Once these have been processed the next frames are frame number 21 and frame number 22 and so on. The entire video may be processed or just a section or sections of it.

Following the comparisons between pairs of frames, a time series of values, or histograms, for each bin is obtained. These are combined at 9, normalized across time, to give a final time series signature for the video.

The second video is processed in the same manner to obtain its own time series signature.

Given two videos with signatures computed as above, the similarity of the videos is determined by comparing the time series signatures.

In the comparison process, for each orientation bin, the time series signatures are compared by using linear segmentation to approximate temporal traces of the histogram and extracting major inclines from the linear segments as a guide to find potential alignments between the compared histograms at 10.

The normalized Euclidean distance between two videos on alignment positions is calculated. If the best matching similarity distance is less than a threshold, the two videos as considered to be copies.

Figure 2:
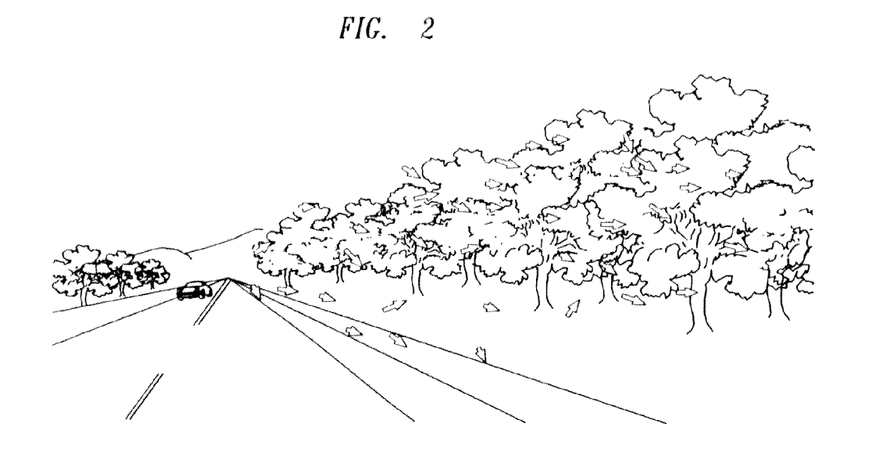
FIG. 2 schematically illustrates aspects of a method in accordance with the invention.

FIG. 2 shows a frame of video with detected keypoints and lines indicating direction (and magnitude) of motion relative to previous frame. The keypoints have been filtered so that only those whose tracked motion has a magnitude falling into a predefined range (in this case, between 3 and 15 pixels) are kept. This is done to reduce false keypoint matches. The histogram of orientations is visualized on top, with each bar depicting an orientation bin. In this case, it can be seen that most of the motion falls within a specific orientation.

Figure 3:
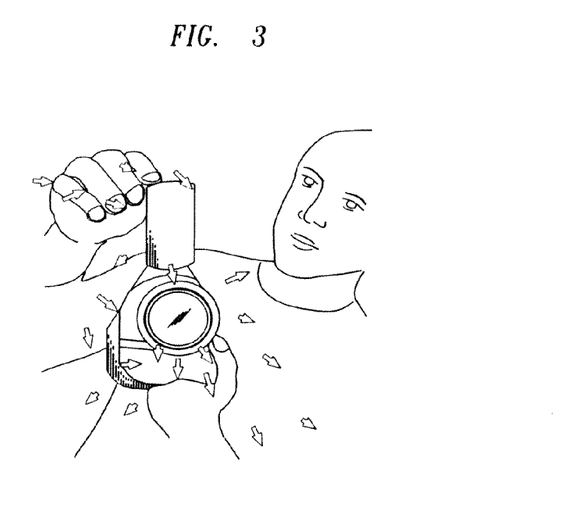
FIG. 3 schematically illustrates aspects of a method in accordance with the invention.

FIG. 3 shows another frame of video with detected keypoints and tracked motion (similar to previous image). However, it can be seen that the orientation of motion is more varied, and this is reflected in the visualized histogram.

Figure 4:
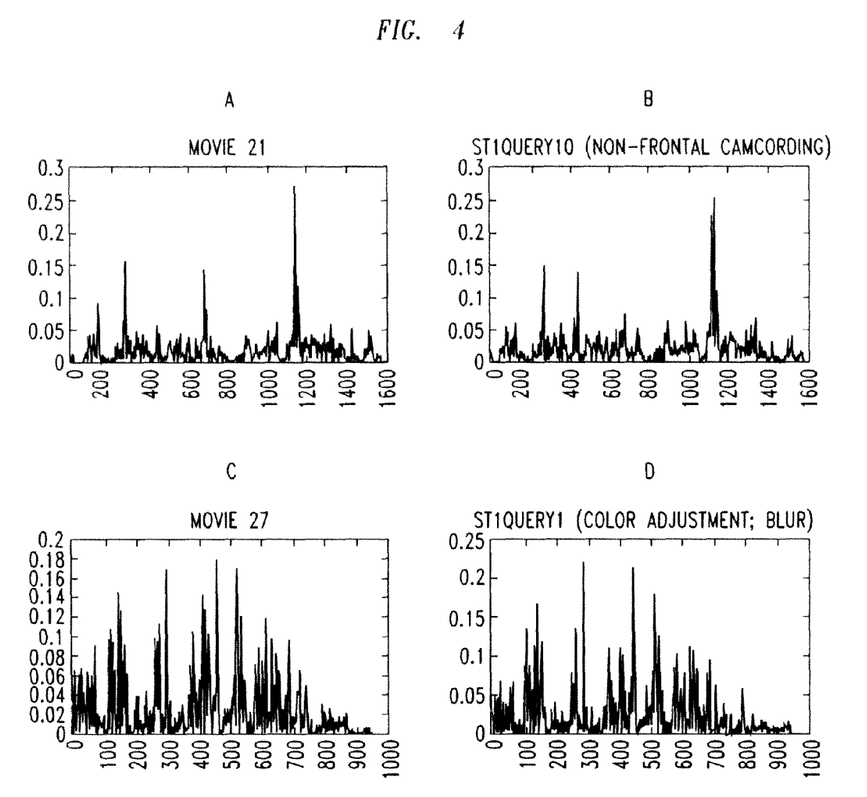

FIGS. 4(*a*) to 4(*b*) are visualizations of change in one orientation bin for different videos across time (values are normalized across time). Original videos are shown on the left (movie21, movie27), their corresponding queries (ST1Query10, ST1Query1) are shown on the right with the video transformations shown in parentheses. A rough correlation can be seen between histograms on the left and the right, despite the robust changes made to the videos.

In an assesment of one method in accordance with the invention, a publicly available video database, MUSCLE VCD benchmark, was used in conducting The database provides videos from variety of programs: sports, documentaries, cartoons, home made movies, old movies in black and white, commercials, et cetera. The MUSCLE VCD benchmark contains a set of ground truth data ST1 for assessing a video copy detection system's performance and accuracy. The ST1 set of videos includes 15 queries with a combined duration of 2 hour 30 min. They are copies of whole long videos, from 5 minutes to 1 hour long. The query videos underwent extensive transformations, including re-encoding, camcording with an angle, cropping and change of color, zooming, add noise, blur and subtitles, etc. In using the tested solution, about 10 minutes were required to search all the queries in ST1, whereas previously the time for the best score obtained by CIVR07 teams took 44 min.

Figure 5:
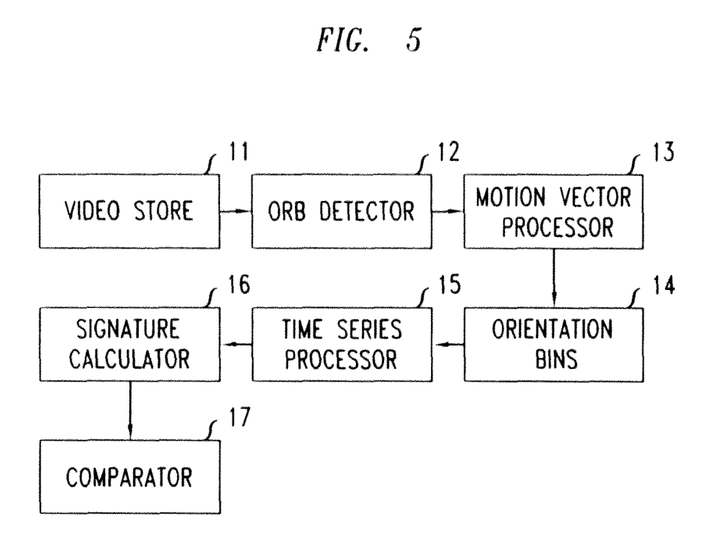
FIG. 5 schematically illustrates an apparatus for implementing the method of FIG. 1.

FIG. 5 illustrates an apparatus used to implement the method of FIG. 1. It includes a video database store 11 for storing videos to be compared, an ORB feature detector 12, motion vector processor 13, orientation bin store 14, time series processor 15 and time series signature calculator 16. Comparison of two videos using their time series signatures is carried out at comparator 17.

The functions of the various elements shown in the figures, including any functional blocks labelled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that

We claim:

1. A method for comparing videos including:
   detecting local features in frames of a video;
   determining positions of the detected local features in a first frame compared to their respective positions in a succeeding second frame;
   for at least some of the detected local features, generating a movement indicator representing the position of a local feature in the first frame relative to the position of said local feature in the second frame, the movement indicator including an orientation, to obtain a plurality of movement indicators;
   grouping the movement indicators into orientation ranges;
   summing the movement indicators grouped in at least one orientation range to obtain an integer quantity of movement indicators for the corresponding orientation range;
   obtaining a time series of values for at least one orientation range by determining the positions of detected local features in a first frame compared to their respective positions in a succeeding second frame for a plurality of pairs of frames; and
   for at least one orientation range, comparing a first time series of values for a first video with a second time series of values for a second video to determine the similarity of the first and second videos;
   wherein the method is performed using a computer or processor.

2. The method as claimed in claim 1 wherein the plurality of pairs of frames are separated by intervals of other frames that are not processed for use in comparing the videos.

3. The method as claimed in claim 1 wherein the movement indicator includes a distance parameter and the movement indicator is included in a grouping by orientation range if its distance parameter is within a predetermined size range and not included in a grouping by orientation range if its distance parameter is outside said predetermined size range.

4. The method as claimed in claim 1 wherein movement indicators are grouped into one of four to ten orientation ranges.

5. The method as claimed in claim 1, further including
   obtaining a plurality of first time series of values for a plurality of respective orientation ranges for the first video;
   combining said plurality of first time series of values to produce a first time series signature;
   obtaining a plurality of second time series of values for a plurality of respective orientation ranges for a second video;
   combining said plurality of second time series of values to produce a second time series signature; and
   comparing the first time series signature and the second time series signature to determine the similarity of the first and second videos.

6. The method as claimed in claim 1 wherein the detected local features are keypoints extracted using a at least one of scale-invariant feature transform (SIFT) algorithm, a Harris corner detection algorithm, a FAST feature detector algorithm, and an ORB feature detector algorithm.

7. The method as claimed in claim 1, further including
   using major incline matching in comparing the first time series with the second time series to determine the similarity of the first and second videos.

8. The method as claimed in claim 1, further including
   performing alignment of the first time series with the second time series;
   calculating a similarity distance between the aligned first time series and second time series; and
   comparing the similarity distance with a predetermined threshold value to determine if the first video and the second video are duplicates.

9. The method as claimed in claim 1, further including
   storing the second video in a video database holding the first video when the second video is determined not to be a duplicate of the first video.

10. A device programmed or configured to perform a method for comparing videos, the method comprising
    detecting local features in frames of a video;
    determining positions of the detected local features in a first frame compared to their respective positions in a succeeding second frame;
    for at least some of the detected local features, generating a movement indicator representing the position of a local feature in the first frame relative to the position of said local feature in the second frame, the movement indicator including an orientation, to obtain a plurality of movement indicators;
    grouping the movement indicators by orientation ranges;
    summing the movement indicators grouped in at least one orientation range to obtain an integer quantity of movement indicators for the corresponding orientation range;
    obtaining a time series of values for at least one orientation range by determining the positions of detected local features in a first frame compared to their respective positions in a succeeding second frame for a plurality of pairs of frames; and
    for at least one orientation range, comparing a first time series of values for a first video with a second time series of values for a second video to determine the similarity of the first and second videos.

11. The device as claimed in claim 10, the method further including
    obtaining a plurality of first time series of values for a plurality of respective orientation ranges for the first video;
    combining said plurality of first time series of values to produce a first time series signature;
    obtaining a plurality of second time series of values for a plurality of respective orientation ranges for a second video;
    combining said plurality of second time series of values to produce a second time series signature; and
    comparing the first time series signature and the second time series signature to determine the similarity of the first and second videos.

12. The device as claimed in claim 10, the method further including
    performing alignment of the first time series with the second time series;
    calculating a similarity distance between the aligned first time series and second time series; and
    comparing the similarity distance with a predetermined threshold value to determine if the first video and the second video are duplicates.

13. A non-transitory computer readable medium storing program instructions that, when executed by a processor, cause a corresponding processor-controlled device to perform a method for comparing videos, the method including:
    detecting local features in frames of a video;
    determining positions of the detected local features in a first frame compared to their respective positions in a succeeding second frame;

for at least some of the detected local features, generating a movement indicator representing the position of a local feature in the first frame relative to the position of said local feature in the second frame the movement indicator including an orientation, to obtain a plurality of movement indicators;

grouping the movement indicators by orientation ranges;

summing the movement indicators grouped in at least one orientation range to obtain an integer quantity of movement indicators for the corresponding orientation range;

obtaining a time series of values for at least one orientation range by determining the positions of detected local features in a first frame compared to their respective positions in a succeeding second frame for a plurality of pairs of frames; and for at least one orientation range, comparing a first time series of values for a first video with a second time series of values for a second video to determine the similarity of the first and second videos.

14. An apparatus for comparing videos, comprising:

a feature detector configured to detect local features in frames of a video;

a motion vector processor configured to determine positions of the detected local features in a first frame compared to their respective positions in a succeeding second frame, to generate a movement indicator representing the position of a local feature in the first frame relative to the position of the local feature in the second frame for at least some of the detected local features to obtain a plurality of movement indicators including an orientation, wherein the motion vector processor is configured to group the movement indicators by orientation ranges for storage in orientation bins;

an orientation bin processor configured to sum the movement indicators grouped in at least one orientation range to obtain an integer quantity of movement indicators for the corresponding orientation range;

a time series processor configured to obtain a time series of values for at least one orientation range by determining the positions of detected local features in a first frame compared to their respective positions in a succeeding second frame for a plurality of pairs of frames; and a comparator configured to compare a first time series of values for a first video with a second time series of values for a second video for at least one orientation range to determine the similarity of the first and second videos.

15. The apparatus as claimed in claim 14 wherein the movement indicator includes a distance parameter and the motion vector processor is configured to include the movement indicator in a grouping by orientation range if its distance parameter is within a predetermined size range and configured to not include the motion indicator in a grouping by orientation range if its distance parameter is outside the predetermined size range.

16. The apparatus as claimed in claim 14 wherein the time series processor is configured to obtain a plurality of first time series of values for a plurality of respective orientation ranges for a first video, to combine the plurality of first time series of values to produce a first time series signature, to obtain a plurality of second time series of values for a plurality of respective orientation ranges for a second video, and to combine the plurality of second time series of values to produce a second time series signature;

wherein the comparator is configured to compare the first time series signature and the second time series signature to determine the similarity of the first and second videos.

17. The apparatus as claimed in claim 14 wherein the feature detector is configured to detect keypoints extracted using at least one of a scale-invariant feature transform (SIFT) algorithm, a Harris corner detection algorithm, a FAST feature detector algorithm, and an ORB feature detector algorithm.

18. The apparatus as claimed in claim 14 wherein the comparator is configured to use major incline matching in comparing the first time series with the second time series to determine the similarity of the first and second videos.

19. The apparatus as claimed in claim 14 wherein the comparator is configured to perform alignment of the first time series with the second time series, to calculate a similarity distance between the aligned first time series and second time series, and to compare the similarity distance with a predetermined threshold value to determine if the first video and the second video are duplicates.

20. The apparatus as claimed in claim 14, further comprising:

a video store configured to store the first video in a video database and configured to store the second video in the video database when the second video is determined not to be a duplicate of the first video.

* * * * *